J. SCHROEDER.
BRAKE FOR FLYING MACHINES.
APPLICATION FILED MAY 21, 1913.

1,156,633.

Patented Oct. 12, 1915.

Witnesses:
Marcus L. Byng.
J. Ellis Glen

Inventor:
Josef Schroeder,
by: His Attorney.

UNITED STATES PATENT OFFICE.

JOSEF SCHROEDER, OF TEGEL, GERMANY, ASSIGNOR TO GENERAL ELECTRIC COMPANY, A CORPORATION OF NEW YORK.

BRAKE FOR FLYING-MACHINES.

1,156,633.  Specification of Letters Patent.  Patented Oct. 12, 1915.

Application filed May 21, 1913. Serial No. 768,979.

*To all whom it may concern:*

Be it known that I, JOSEF SCHROEDER, a subject of the King of Prussia, residing at Tegel, Germany, have invented certain new and useful Improvements in Brakes for Flying-Machines, of which the following is a specification.

Flying machines as now constructed are provided with two or more wheels adapted to roll along the ground when the machine is being started and stopped and also to facilitate the moving thereof from place to place. These wheels are commonly provided with pneumatic rubber tires and obviously if brakes are applied thereto to stop the machine after a flight there is danger of injuring the tires, particularly if the ground is rough or covered with sharp stones or other cutting material.

My invention has for its object to improve the braking mechanism of a flying machine by providing one or more brakes, each of which is arranged or adapted to make sliding contact with the ground in advance of the wheels, subject to the control of the operator, thereby protecting the wheel tires from injury and at the same time presenting relatively large surfaces to the ground so that the braking effect will be greater than would be possible with the relatively small tires commonly in use.

Figure 1:
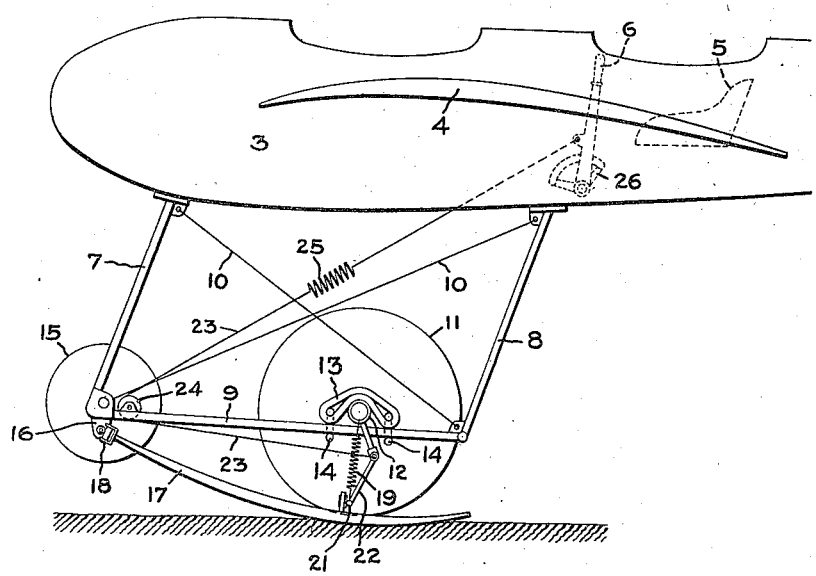
Figure 2:
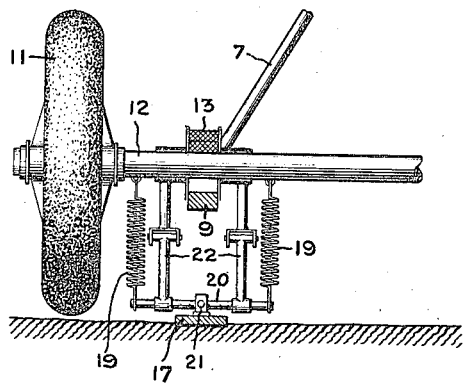

In the accompanying drawing which illustrates one of the embodiments of my invention, Figure 1 is a view in side elevation of a flying machine equipped with my improved braking mechanism, and Fig. 2 is an enlarged detailed view of a part of the same.

3 indicates a body of any suitable form and construction. It is provided with two or more vanes or wings for sustaining it in the air. The wings 4 may be taken as typical illustrations of suitable means for this purpose. I have omitted the engine and means for steering the machine since these are unnecessary to an understanding of my invention.

5 indicates the seat of the operator and 6 the handle for controlling the brakes as will appear later.

Underneath the body is a frame work of any suitable construction. As shown it comprises front and rear members 7 and 8 and substantially horizontal bars 9 connecting the front and rear members. The frame is braced by stay wires or braces 10.

11 indicates a wheel provided with a pneumatic tire, said wheel being adapted to roll along the ground when the machine is being started into operation and brought to rest, and also to facilitate the moving of the machine from place to place. Two of these wheels 11 are provided and mounted on the tubular shaft 12. This shaft is attached to the lower part of the frame by a suitable yielding connection. For example, I may use heavy elastic bands 13 which pass over the shaft and are secured to the frame by holders 14 of any suitable construction. The same arrangement is of course provided for both wheels so that when the wheels strike an obstruction or deliver a blow the shock will be absorbed by the springs 13 and not be transmitted directly to the body of the machine. In the front of the machine are other wheels 15 of which one or more may be provided. These wheels coöperate with the main wheels to hold the machine in an upright position.

The lower part of the frame is provided with a hanger 16 to which is attached the brake shoe 17 by the universal connection 18. The brake shoe which extends rearwardly to a point beyond the axle should preferably present a considerable area to the ground so that effective braking action will be had as it slides along. In order to keep the brake shoe out of contact with the ground when it is desired to move the machine from place to place one or more springs 19 are provided that are attached at their upper ends to the hollow shaft 12 and at their lower ends to the cross-head 20. The cross-head is connected by a universal joint 21 with the upper side of the brake shoe. In order to depress the shoe so that it will extend below the wheel 11, one or more toggles 22 are provided which are normally collapsed by reason of the springs 19. By straightening the members of the toggles the position of the shoe can be changed with respect to the axle and wheel. In order to control the action of the toggle a wire 23 is connected to the toggle or toggles and passes over a pulley 24 supported by the frame 9. The other end of the wire is connected to the handle 6 which is inside of the body and within easy reach of the operator. In the wire is a rather stiff spring 25 which prevents the direct transmission of shocks from the shoe and toggle or toggles to the control handle 6, the latter being latched to the quadrant 26 as is the common practice with locomotive throttle levers, etc. I have only illustrated a single wheel 11 and one brake shoe, but it is to be understood that two of these wheels will be provided and at least two brake shoes, which shoes should be rather widely separated in order to prevent the machine from tilting sidewise when landing after a flight.

The brake shoes are normally held up out of the way and the machine can be rolled around on wheels 11 and 15 as desired. Assuming that the machine is in flight and it is desired to make a landing the operator grasps the lever 6 and pulls it toward him until he has depressed the rear ends of the shoes to a point below the greatest diameter of the wheels. Then as the machine gradually descends to the ground the shoes will strike first and its weight thereof will be taken up by the shoes wholly or in principal part, depending upon the relation of the pressure exerted on the shoes to the tension of the spring 25. In any event the brakes should be adjusted by the operator so that they will strike the ground before the wheels, thus relieving the latter of the wear and tear.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. In a flying machine, the combination of a frame, an axle, road wheels mounted on the axle, elastic means connecting the axle to the frame, a brake shoe pivotally attached to the frame at its forward end, a spring that normally holds the rear end of the brake above the point of contact between the wheel and ground, and means connecting the rear end of the brake to the axle, and controllable by the operator for increasing the stress on the spring and moving the rear end of the brake to a point below the wheels so that it will strike the ground in advance thereof.

2. In a flying machine, the combination of a body, a depending frame, road wheels, an axle therefor, elastic means for attaching the axle to the frame, a brake shoe pivotally attached at its forward end to the frame and extending rearwardly beyond the axle, and means interposed between the axle and shoe for depressing the same to a point below the point of contact between the wheels and ground.

3. In a flying machine, the combination of a body, a depending frame, road wheels, an axle therefor, elastic means for attaching the axle to the frame, a brake shoe pivotally attached at its forward end to the frame and extending rearwardly beyond the axle, a toggle interposed between the elastically supported axle and the shoe to depress the latter, and means controllable by the operator for moving the members of the toggle.

4. In a flying machine, the combination of a body, a depending frame, road wheels, an axle therefor, elastic means attaching the axle to the frame, a brake shoe pivotally attached at its forward end to the frame and extending rearwardly beyond the axle, a toggle interposed between the elastically supported axle and the shoe to depress the latter, means controllable by the operator for moving the members of the toggle, and a spring which normally tends to hold the toggle in collapsed position and to raise the shoe above the point of contact between the wheels and ground.

5. In a flying machine, the combination of a body, a depending frame, road wheels, an axle therefor, elastic means for attaching the axle to the frame, a brake shoe attached to the frame by a universal joint at its forward end and extending rearwardly beyond the axle, a cross-head that is attached to the shoe by a universal joint, toggles between the cross-head and the elastically supported axle, spring means that tend to lift the shoe, means for straightening the members of the toggles to depress the rear end of the shoe, and a handle on the body whereby the operator can actuate said means.

6. In a flying machine, the combination of a frame, road wheels, an axle therefor, elastic means for attaching it to the frame, a brake pivotally supported at its forward end on the frame and extending rearwardly beyond the road wheels, a member connecting the brake to the axle which is moved to depress the brake, spring means which tends to lift the brake, an operating handle, and means connecting the operating handle to the member for lowering it, said means including an elastic device to absorb the shock when the brake strikes the ground in advance of the wheels.

In witness whereof, I have hereunto set my hand this 2 day of May, 1913.

JOSEF SCHROEDER.

Witnesses:
PAUL STUMP,
RICHARD SCHWINN.